United States Patent Office 3,413,378
Patented Nov. 26, 1968

3,413,378
GRAFT COPOLYMERS OF NITRILE GROUPS ON POLYAMIDE SUBSTRATES
Eugene Edward Magat, Spring Valley, Wilmington, Del., and David Tanner, Charlottesville, Va., assignors to E. I. du Pont de Nemours and Company, Wilmington, Del., a corporation of Delaware
No Drawing. Continuation-in-part of application Ser. No. 578,414, Sept. 9, 1966, which is a continuation of application Ser. No. 863,047, Dec. 30, 1959. This application Nov. 14, 1966, Ser. No. 593,659
6 Claims. (Cl. 260—857)

ABSTRACT OF THE DISCLOSURE

Shaped structures of a graft copolymer comprising a polyamide and side chains bearing nitrile radicals, grafted thereto, by carbon to carbon bonds. Structures have improved light durability, resistance to soiling, crease recovery, dyeability, and resistance to caustic attack and wrinkling, as compared to unmodified polymer.

---

This application is a continuation-in-part of application Ser. No. 578,414, filed Sept. 9, 1966, which is a continuation of application Ser. No. 863,047, filed Dec. 30, 1959 (now abandoned), which is a division of application Ser. No. 735,288, filed May 14, 1958, now U.S. Patent 3,188,228, which is a continuation-in-part of our abandoned applications Ser. No. 499,754, filed Apr. 6, 1955, and Ser. No. 503,790, filed Apr. 25, 1955.

INTRODUCTION

This invention is concerned with fibers from grafted synthetic polymeric esters and amides.

STATE OF THE ART

Grafted copolymers have been developed for many end-uses. Grafted synthetic linear condensation polymers have been studied less extensively than the addition polymers, since the latter are especially adapted to grafting reactions requiring free radical activity, which may be present as a result of the polymerization process, or may be induced by activating residual unsaturated (double) bonds.

By means of these grafts, properties not normally found in condensation polymers may be provided. For example, increased reactivity, improved static resistance, resistance to hole melting and the like can be attained without significant loss in the properties of the substrate polymer.

OBJECT

It is an object of the present invention to provide a graft copolymer of a polyamide or polyester substrate which has improved resistance to soiling, caustic attack and wrinkling, improved light durability, crease recovery, and dyeability, as compared to unmodified polymer.

THE INVENTION

These and other objects are attained in a graft copolymer textile comprising (a) a synthetic linear condensation polymer substrate selected from the class consisting of polyamides and polyesters, and (b) side chains bearing nitrile radicals, grafted thereto, by carbon to carbon bonds.

The polyamide which serves as a substrate for grafting is a fiber-forming polyamide wherein the amide linkage is an integral part of the polyamide chain. Similarly, the polyesters are those wherein the ester linkage is an integral part of the polymer chain. The grafted polymer chains are bonded by carbon-carbon linkages to the substrate polymer backbone.

The preferred modifier for grafting to the condensation polymer substrate is acrylonitrile. However, other unsaturated nitriles are useful, such as the α-substituted nitriles, for example, methacrylonitrile, the cyano substituted styrenes, dinitriles such as vinylidene dinitrile and the like.

Although useful modifications are obtained when as little as 1% acrylonitrile is grafted to the substrate, it is desirable to graft from 4 to 70% by weight; the preferred range is from 10 to 50% weight increase for polyamides.

Grafting is most conveniently initiated by high energy radiation, such as high energy electrons, X- or gamma-rays. The polymer substrate may be soaked in the modifier either as a liquid or as a solution and the combination irradiated in a single step operation. Alternatively, the polymer substrate may be irradiated at room temperature and then preferably substantially immediately, contacted with the modifier in a two-step process. A preferred embodiment of the two-step process is to irradiate the polymer below 10° C., preferably below 0° C. and then contact it with the modifier. Grafting occurs as the combination is warmed.

The invention is illustrated by the following examples but it is not limited thereby. Unless otherwise indicated, weight percentages are intended. Irradiation doses are given in mrad where 1 mrad is equal to 1,000,000 rads.

Example 1

A sample of 66 nylon (polyhexamethylene adipamide) fabric is immersed in liquid acrylonitrile. It is then wrapped in aluminum foil and irradiated with 2 mev. X-rays, as described below, until a dose of 23 mrads is attained.

The sample is exposed to X-radiation using a resonant transformer X-ray machine marketed by the General Electric Co., Schenectady, N.Y., known as a "Two Million Volt Mobile X-ray Unit." This machine is described by E. E. Charlton and W. F. Westendorf in the Proceedings of the First National Electronics Conference, p. 425, October 1944. The packaged sample is placed in an open top box made from $\frac{1}{16}$ inch sheet lead, and positioned so that the sample is 8 cm. from the tungsten tube target. At this location, using a tube voltage of 2 mev., and a tube current of 1.5 milliamperes, the irradiation rate for the sample in question is 1.2 mrads per hour. The beam irradiates a circle about 3 inches in diameter; all fabric tests are made on the irradiated portion.

Following the irradiation, ungrafted polymer is removed by washing with dimethylformamide. After 15 hot water washings in a household detergent, the dried nylon fabric has a superior crease recovery and greater resilience than before treatment by the process of this invention.

A second sample is immersed in liquid acrylonitrile. It is then wrapped in aluminum foil and irradiated as before to a dose of 5 mrads. After thorough rinsing, the weight gain is 12%. Larger irradiation doses produce larger weight gains.

It is shown that a bulk modification has been obtained by hydrolyzing the nylon-acrylonitrile graft by a 30 minute boil-off in 3% sodium hydroxide. The fabric which now contains a large number of additional carboxyl groups due to hydrolysis of the nitrile groups, is then dyed with a basic dye (C.I. No. 662). Cross-sections of filaments taken from these fabrics are deeply dyed throughout the modified filament, whereas only light shades are observed in cross-sections of filaments taken from control fabrics which had received the same caustic boil-off and dyeing treatment without irradiation. The hydrolyzed test fabric has a log R of 9.4 vs. 13.3 for control, showing decreased tendency to accumulate static charges (see A.A.T.C.C. Test Method 76–1959).

Example 2

A sample coded A of 66 nylon fabric is immersed in liquid acrylonitrile. It is then wrapped in aluminium foil and irradiated with one million electron volt (1 mev.) electrons using a resonant transformer with a beam-out current of 560 microamperes. The sample is traversed back and forth under the beam until a dose of 17 mrads is attained. The product softens at 240° C. and is almost completely soluble in formic acid. It is observed to possess a higher crease resistance and greater resiliency than the original sample. This improved resiliency is retained even after 15 washings in a household detergent following a washing in dimethylformamide (a solvent for polyacrylonitrile).

The test is repeated with 66 nylon samples C and D, which are soaked 24 hrs. at 25° C. in solutions of acrylonitrile, water and methanol, as indicated in Table 1. Each sample is enclosed in a polyethylene bag with excess solution and is irradiated using a 2 mev. Van de Graff electron accelerator with a beam-out current of 250 microamperes. The samples are traversed twice under the beam to give a dose of 2 mrad.

After a hold-up time of 2 hours, the samples are thoroughly rinsed in dimethylformamide at 70° C., followed by acetone and then water. The weight gain of each is determined and listed in Table 1. The breaking strength of representative yarn samples from each fabric is determined after 0 and 500 hours' exposure to ultraviolet light in a Weatherometer. A control, B, is included in the table for comparison purposes; the control is not exposed to the high energy electrons.

TABLE 1

| Sample | Grafting solution | Percent wt. gain | Yarn breaking strength, gm. | |
|---|---|---|---|---|
| | | | 0 hour | Weatherometer, 500 hours |
| B | None | None | 386 | 30 |
| C | *5/22/22 | 10.1 | 393 | 58 |
| D | 25/12/22 | 36.1 | 402 | 100 |

*Solution composition=ml. acrylonitrile/ml. H₂O/ml. CH₃OH.

The grafted acrylonitrile greatly increases the light durability of the nylon.

Example 3

A series of sample swatches of tropical worsted staple fabric prepared from polyethylene terephthalate filaments are soaked in a 50% solution of acrylonitrile dissolved in a mixed solvent of 42% ethanol and 58% water, and are then heated at 90° C. for 30 minutes. The fabric samples are transferred to stainless steel pans containing 200 ml. of the treating solution, and irradiated for one pass (dose, 1 mrad) under a 2 mev. electron beam at 250 microamps. The irradiation temperature is 90° C. The grafted fabric is extracted in boiling dimethylformamide to remove unreacted monomer and unattached polymer, after which it is dried at 80° C. The observed weight gain is 4.4%. The test is repeated, with fabric samples A, B and C. The composition of treating solutions, radiation dose and weight gain are shown in Table 2.

The acrylonitrile-grafted polyethylene terephthalate is found to be more resistant to alkaline hydrolysis (e.g., resistant to scouring) than the ungrafted fabric; it is also more resistant to soil pickup. Fabrics samples A to D, in which D is a control bearing no grafted acrylonitrile, are subjected to a laboratory test for laundry soiling. In this test fifty ¼ inch steel balls, 0.1 g. of vacuum cleaner soil, 0.04 g. carbon black, and 20 ml. of Wagg oil, (R. E. Wagg: J. Text. Inst., 1952, T515.), are placed in a pint "Launder-Meter" jar. After evaporation of the oil vehicle, 100 ml. of 0.1% soap solution (commercial laundry soap) is added. This mixture is then conditioned (with occasional stirring) for 1 hour at 72° C. Two 3″ x 3″ fabric swatches (test+cotton control) are placed in each jar, and the mixture is tumbled for 1 hour. The swatches are then removed, rinsed thoroughly, and allowed to dry. Each swatch is then pressed for 30 seconds at 160–170° C. using a hand iron. Reflectances are measured before and after washing and after pressing. At least 3 samples of each fabric are used (3 jars), and the reflectances averaged. Results are recorded either as differential in reflectance (DR) between original sample and washed sample, or differential between original sample and ironed sample. The difference in reflectance of the samples is determined before and after the laundry test and is indicated in the column headed DR of Table 2. A low value for DR indicates nearly complete removal of soil, whereas a high value for DR indicates a fabric which retained all the applied soil. Cotton normally gives a DR value of 7 to 9, which is considered satisfactory. It is observed that soil removal improves with the amount of acrylonitrile grafted. In addition, the grafted polyethylene terephthalate fabric is more resistant to an alkaline hydrolysis. This is shown in the last column of Table 2, wherein the ratio of weight loss for the test item to that of control (D) is indicated for a two-hour boil in 1% sodium hydroxide solution. Again, increased amounts of grafted acrylonitrile show increased alkaline stability. When the test is repeated using (a) a mixture of acrylonitrile and α-methyl-styrene or (b) acrylonitrile and styrene, resistance to alkaline hydrolysis is improved over that obtained when only acrylonitrile is grafted.

TABLE 2.—ANTISOILING AND ALKALINE SENSITIVITY OF POLYETHYLENE TEREPHTHALATE

| Sample No. | Treat solu., percent AN* | Percent wt. gain | Dose, mrad | D. R. | Alkaline sensitivity |
|---|---|---|---|---|---|
| A | 20 | 2.0 | 1 | 12 | 0.84 |
| B | 20 | 2.4 | 2 | 11 | 0.74 |
| C | 50 | 4.4 | 1 | 8 | 0.71 |
| D | Control | None | | 17–20 | 1.00 |

*AN=acrylonitrile in ethanol-water solvent.

A portion of sample C is dyed for 2 hours at the boil with a disperse dye, in a bath containing 0.13 gm./l. C.I. No. Disp. Red 11, 1.0 g./l. of an anionic hydrocarbon-sodium-sulfonate softener, 2.5 g./l. dimethyl terephthalate, 2.5 g./l. benzamide. A bath-to-fabric ratio of 40:1 is employed. The dye is exhausted, and scoured sample C is found to have a deep, attractive shade. Control D, similarly dyed, does not exhaust the bath, and the shade is much lighter.

A second portion of C is dyed, using the cuprous ion technique, as follows: the sample is placed in a bath (bath-to-fabric ratio, 40:1) at 72° C. containing (based on weight of fabric) 1% C.I. No. Acid Yellow 2, 0.1% sodium salt of unsaturated long-chain alcohol sulfate (wetting agent); the temperature is raised to 82° C., and 2.5% copper sulfate is added, followed by 1.0% hydroxyl ammonium sulfate; the bath is then heated to the boil for 2 hrs., followed by a scour. Test sample C is dyed a good shade, whereas in an attempt to similarly dye the control, D, it remains uncolored.

METHOD OF APPLICATION

The substrate polymer may be contacted with the modifier composition before or after irradiation, as already stated. It may be applied to the fiber as a liquid or vapor, or may be applied as a solution or an emulsion. Some peneration of the composition into the polymer is usually desirable; chosing a solvent having a swelling effect on the substrate will increase the rate of diffusion. Presoaking in the modifier solution before irradiating will also enhance penetration. Alternatively, the polymer may be preswollen with swelling agent before contacting with the modifier composition. When contacting preirradiated substrate polymer, it is usually helpful to heat the modifier composition containing the preirradiated substrate to accelerate the reaction. This is especially helpful with polyethylene terephthalate, which grafts best at temperatures above 80° C. In general, however, temperatures of 50 to 150° C. are satisfactory.

It is within the scope of this invention to employ multifunctional unsaturated modifiers to produce some additional effect such as improved antistatic effect, flame resistance, hand, and the like, as long as the modifiers also contain nitrile radicals. It is preferred that no more than 49% of any other graft component be present.

IRRADIATION CONDITIONS

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electrons volts (ev.) and above is effective for the process of this invention, although energies of 50,000 ev. and over are preferred. Both particle radiation and ionizing electromagnetic radiation are included.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

The high energy particle radiation is an emission of highly accelerated electrons or nuclear particles such as protons, neutrons, alpha particles, deuterons, beta particles, or the like, directed so that the said particle impinges upon the polymer.

Similarly, ionizing electromagnetic radiation (X-rays) useful in the process of this invention is produced when a metal target (e.g., gold or tungsten) is bombarded by electrons possessing appropriate energy, e.g., 0.1 mev. In addition to X-rays produced as indicated above, ionizing electromagnetic radiation suitable for carrying out the process of the invention may be obtained from a nuclear reactor ("pile") or from natural or artificial radioactive material, for example, cobalt 60.

The dose rate ("intensity" of dose) is not critical, being primarily a matter of available equipment. In general, high dose rates are preferred as promoting higher throughput.

Efficiency of dose utilization will usually be improved by keeping the fiber and excess monomer mixture in contact for an extended time after irradiation, with either the two-step on one-step process. This will provide maximum opportunity for the radical-initiated chains to grow.

SUBSTRATE SHAPE

The product of the instant invention may be grafted before or after converting to its final (i.e., filament) shape, if the modifier is sufficiently stable thermally to stand the temperatures required for melt spinning. It is preferred to graft to the fiber. When the fiber is grafted, it may be grafted before or after drawing. It may be grafted as yarn, staple, flock, tow or fabric of knitted, felted, or woven construction.

SUBSTRATES

Substrates useful for the graft copolymer of this invention are the synthetic linear fiber-forming polyamides and polyesters. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide), polycaprolactam, poly-(hexamethylene sebacamide), polyaminoundecanoamide, poly(hexamethylene isophthalamide), poly(2 - methyl hexamethylene terephthalamide), poly(metaxylylene adipamide), poly(para-xylylene sebacamide), poly(octamethylene oxalamide), and the polyamide from bis (4-aminocyclohexyl)methane and aliphatic acids such as dodecanedioic acid. Copolymers having two or more components, as well as polymer and copolymer mixtures of the above are also included.

In addition to the polyamides, the invention is especially applicable to the crystallizable, linear condensation polyesters. These comprise linear polyesters containing in the polymer carbonyloxy linking radicals,

Polymers containing oxycarbonyloxy radicals are comprehended with this group. The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts phenol and 41.2 parts of trichlorophenol. Copolyesters, terpolyesters, and the like are intended to be comprehended within the term "polyesters."

Examples of crystallizable, linear condensation polyesters include polyethylene terephthalate, polyethyene terephthalate/isophthalate (85/15), polyethylene terephthalate/5-(sodium sulfo)isophthalate (97/3), poly(p-hexahydroxylylene terephthalate), polyhydroxypivalic acid, poly(decahydronaphthalene-2,6-dimethylene 4,4'-bibenzoate), polyethylene 2,6- or 2,7-naphthalenedicarboxylate, and poly(bicyclohexyl-4,4'-dimethylene-4,4'-bibenzoate), as well as many others. Preferably, the polyester is a linear glycol terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mol percent terephthalic acid.

UTILITY

The graft copolymers bearing nitrile radicals according to this invention have improved light durability, resistance to soiling, static, and alkaline hydrolysis. Partial hydrolysis of the acrylonitrile grafted to polyethylene terephthalate results in fibers and fabrics that are more readily dyeable especially with basic dyes; the polymer substrate is also protected against hydrolytic degradation. Improvement in wickability and comfort is also noted.

What is claimed is:

1. A shaped structure of a graft copolymer formed from a polyamide wherein the recurring amide linkages are an integral part of the polymer chain, the shaped structure of the said polyamide having side chains bearing nitrile radicals graft polymerized thereto.
2. The structure of claim 1 in the form of a filament.
3. The structure of claim 1 in the form of a film.
4. The structure of claim 1 wherein said side chains are poly(acrylonitrile).
5. The structure of claim 4 wherein said polymer is polyethylene adipamide.
6. The structure of claim 1 wherein said polymer is polyhexamethylene adipamide.

References Cited

UNITED STATES PATENTS 3,115,418   12/1963   Magat _____ 204—159.15

FOREIGN PATENTS 679,562   9/1952   Great Britain.

MURRAY TILLMAN, *Primary Examiner,*

P. LIEBERMAN, *Assistant Examiner.*